United States Patent [19]
Suzuki et al.

[11] Patent Number: 5,954,163
[45] Date of Patent: Sep. 21, 1999

[54] SPRING FOR DISC BRAKE

[75] Inventors: Shinji Suzuki; Takahiro Tokunaga, both of Yamanashi-ken, Japan

[73] Assignee: Tokico Ltd., Kawasaki, Japan

[21] Appl. No.: 08/936,838

[22] Filed: Sep. 25, 1997

[30] Foreign Application Priority Data

Oct. 3, 1996 [JP] Japan ................................. 8-281835

[51] Int. Cl.⁶ .................................................. F16D 65/40
[52] U.S. Cl. .................................. 188/73.38; 188/250 G
[58] Field of Search ............................. 188/250 G, 73.31, 188/73.32, 73.38, 72.3, 73.37

[56] References Cited

U.S. PATENT DOCUMENTS

| | | | |
|---|---|---|---|
| 4,171,037 | 10/1979 | Souma et al. ........................ | 188/73.38 |
| 4,580,664 | 4/1986 | Kondo ................................. | 188/73.38 |
| 5,113,978 | 5/1992 | Weller et al. ........................ | 188/73.31 |

Primary Examiner—Matthew C. Graham
Assistant Examiner—Robert A. Siconolfi
Attorney, Agent, or Firm—Wenderoth, Lind & Ponack, L.L.P.

[57] ABSTRACT

In the disk brake of the present invention, each arm of the carrier has a projecting pad guide, and each friction pad has recesses fitted onto the pad guides of the carrier. Each pad spring has integrally formed therewith a generally U-shaped guide plate which is bent along the pad guide and resiliently engaged with and presses against the pad guide to thereby mount the pad spring on the arm of the carrier. Each recess of the friction pads includes a groove at a position corresponding to at least one bent portion of the guide plate, which is separated from a corner portion of the pad guide and deformed into a projection toward the recess.

11 Claims, 7 Drawing Sheets

SPRING FOR DISC BRAKE

BACKGROUND OF THE INVENTION

The present invention relates to a disk brake which is advantageously used for applying a braking force to, for example, a vehicle.

As a conventional disk brake, there has been known a disk brake comprising: a carrier including a pair of arms spaced from each other in the circumferential direction of a disk and axially extending across an outer circumference of the disk, each of the arms having a projecting pad guide; a caliper; a pair of friction pads adapted to be pressed against both surfaces of the disk by the caliper and each having recesses fitted onto the pad guides of the carrier; and a pair of pad springs, respectively, mounted on the pad guides of the carrier and resiliently pressing against the friction pads to thereby stably hold the friction pads between the pad guides of the carrier.

In the above-mentioned disk brake, when the brake is operated, a piston in a cylinder provided in the caliper on an inner side of the disk is caused to slide toward the disk in response to fluid pressure applied from the outside, so that the friction pads are pressed against the inner and outer surfaces of the disk between the piston and an outer side of the caliper, to thereby apply a braking force to the disk. In this instance, a braking torque acting on the friction pads is transmitted from the recesses of the friction pads to the pad guides of the carrier.

Each of the pad springs mounted on the pad guides of the carrier is made of, for example, a stainless steel plate. Each pad spring has integrally formed therewith a generally U-shaped guide plate which is bent along the corresponding pad guide of the carrier on which the pad spring is mounted. The guide plate is resiliently engaged with and presses against the corresponding pad guide of the carrier, so that the pad spring can be surely held in position, relative to the carrier.

Since the guide plate of each pad spring is positioned between the corresponding pad guide of the carrier and the friction pad, there is no disadvantage such that when the braking torque acting on the friction pad is transmitted to the pad guide of the carrier during operation of the brake, the friction pad, which includes a backing plate made of, for example, hot-rolled sheet steel, is likely to form an impression on the pad guide of the carrier, which is made of cast iron. In addition, due to the guide plate being positioned between the corresponding pad guide of the carrier and the friction pad, a lowering of slidability of the friction pad during operation of the brake, which is caused by adhesion of the friction pad to the pad guide due to rust accumulating on the backing plate of the friction pad and the pad guide, is suppressed, so as to prevent the occurrence of "drag" after operation of the brake.

In order to suppress a lowering of slidability of the friction pad during operation of the brake due to rust accumulating on the backing plate of the friction pad and the pad guide, there is provided a clearance between the guide plate of each pad spring, which is mounted on the pad guide of the carrier which receives a braking torque from the friction pad, and the recess of the friction pad which is fitted onto the pad guide. In order to prevent the friction pad from generating noise during operation of the brake, such as rattling and clonk noise, the size of the above-mentioned clearance between the guide plate of the pad spring and the recess of the friction pad is set to a size as small as, for example, 0.1 to 0.9 mm.

However, in the above-mentioned conventional disk brake in which the guide plate of each pad spring is resiliently engaged with and presses against the corresponding pad guide of the carrier, when the guide plate, and hence the pad spring, is mounted on the pad guide, a bent portion of the generally U-shaped guide plate is separated from a corner portion of the projecting pad guide and deformed into a projection in a circumferential direction of the disk toward the recess of the friction pad which is fitted onto the pad guide (as shown in FIG. 4). On the other hand, as mentioned above, the size of the clearance between the guide plate of each pad spring, which is mounted on the pad guide of the carrier, and the recess of the friction pad which is fitted onto the pad guide must be small, in order to prevent the friction pad from generating noise during operation of the brake. As a result, when fitting the recess of the friction pad onto the pad guide of the carrier with the guide plate of the pad spring being disposed therebetween, a problemd arises, such that the bent portion of the guide plate of the pad spring which is deformed into a projection at a corner portion of the pad guide interferes with the recess of the friction pad, whereby a time-consuming and cumbersome operation is required for mounting the friction pad on the carrier, thereby lowering operability.

Further, when the friction pad is forcibly mounted on the carrier regardless of the above-mentioned interference of the bent portion of the guide plate with the recess of the friction pad, a problem arises, such that the bent portion of the guide plate is brought into frictional contact with (interferes with) the recess of the friction pad, whereby slidability of the recess of the friction pad relative to the guide plate becomes low, leading to the occurrence of "drag" after operation of the brake.

BRIEF SUMMARY OF THE INVENTION

In order to solve the above-mentioned problems accompanying the conventional disk brake, the present invention has been made. It is a primary object of the present invention to provide a disk brake in which when fitting the recess of the friction pad onto the pad guide of the carrier with the guide plate of the pad spring being interposed therebetween, interference of the guide plate of the pad spring with the recess of the friction pad can be surely prevented, so that the friction pad can be easily mounted on the carrier, and in which when the friction pad is mounted on the carrier, slidability of the friction pad can be maintained to thereby enable smooth operation of the brake.

According to the present invention, there is provided a disk brake comprising:

a carrier including a pair of arms spaced from each other in the circumferential direction of a disk and axially extending across an outer circumference of the disk, each of the arms having formed therewith a projecting pad guide;

a caliper;

a pair of friction pads adapted to be pressed against both surfaces of the disk by the caliper and each having recesses fitted onto the pad guides of the carrier; and a pair of pad springs, respectively, mounted at least on the pad guides of the carrier, the pad springs resiliently pressing the friction pads so as to reduce a play and each having integrally formed therewith a guide plate, the guide plate being bent along the corresponding pad guide of the carrier on which the pad spring is mounted and being resiliently engaged with and pressing against the corresponding pad guide.

The characteristic feature of the disk brake of the present invention resides in that each recess of the friction pads includes an indent at a position corresponding to at least one of the bent portions of the guide plate of the pad spring mounted on the pad guide onto which the recess of the friction pads is fitted.

In the above-mentioned disk brake of the present invention, each pad spring is mounted on the carrier through the guide plate which is resiliently engaged with and presses against the corresponding pad guide of the carrier on which the pad spring is mounted, so that the pad spring can be firmly and stably mounted on the carrier.

Further, in the disk brake of the present invention, when at least one bent portion of the guide plate of the pad spring is separated from a corner portion of the corresponding pad guide of the carrier due to the resiliency of the guide plate and deformed into a projection toward the recess of the friction pad which is fitted onto the corresponding pad guide, it is possible to form an indent in the recess of the friction pad at a position corresponding to the projecting bent portion of the guide plate, so that the projecting bent portion of the guide plate can be accommodated within the indent in the recess and hence, interference of the projecting bent portion relative to the recess can be prevented.

The foregoing and other objects, features and advantages of the present invention will be apparent from the following detailed description and appended claim taken in connection with the accompanying drawings.

DETAILED DESCRIPTION OF THE INVENTION

Figure 1:
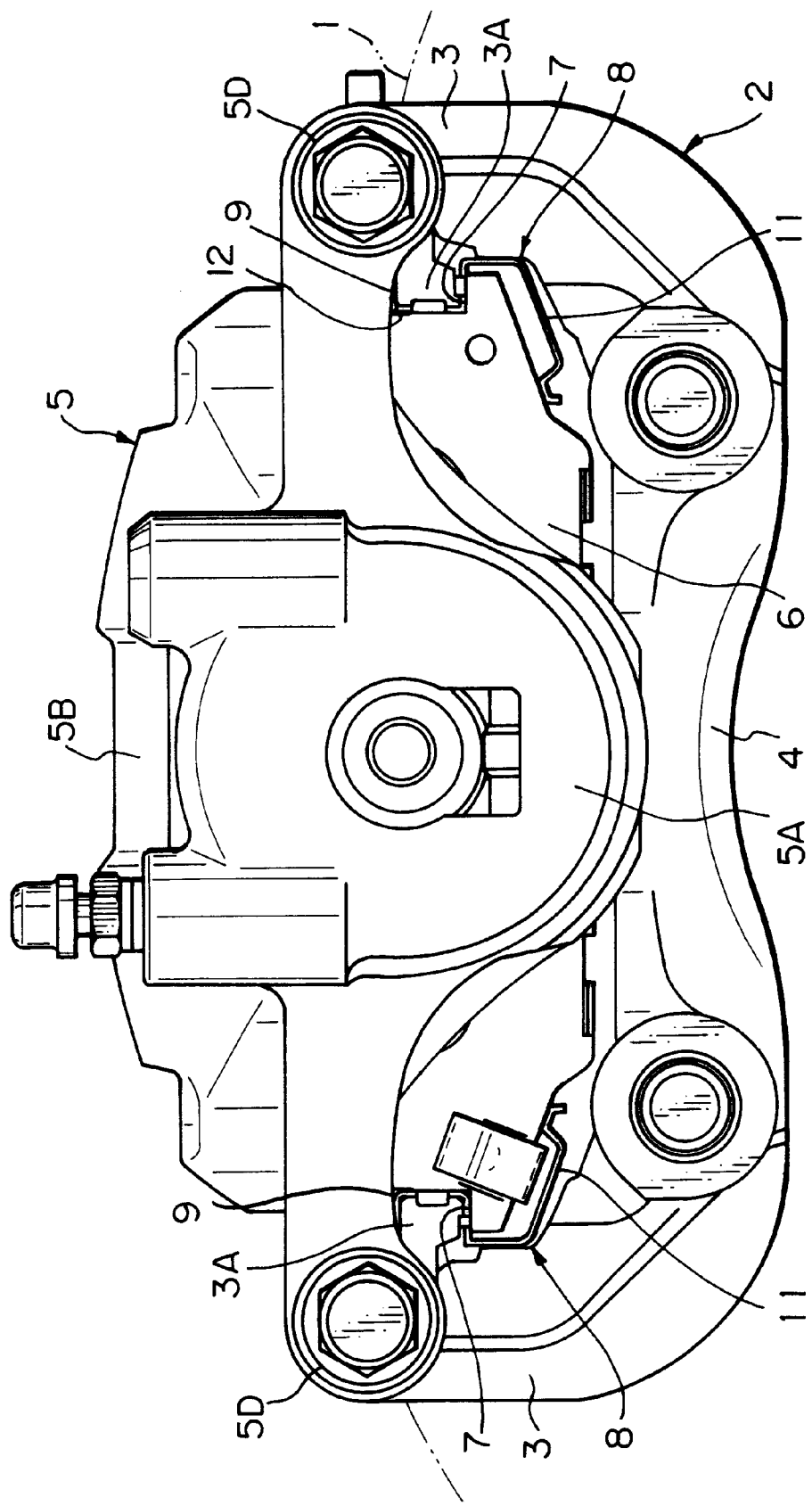
FIG. 1 is a front view of the disk brake according to a first embodiment of the present invention.

Hereinbelow, embodiments of the present invention will be explained, with reference to the accompanying drawings.

A first embodiment of the present invention is shown in FIG. 1 through FIG. 5.

In FIGS. 1 through 5, reference numeral 1 denotes a disk which rotates together with a wheel of an automobile, and reference numeral 2 denotes a carrier integrally mounted on a non-rotating part of the automobile at a position on an inner side of the disk 1. The carrier 2 is integrally formed from a pair of arms 3 spaced from each other in the circumferential direction of the disk 1 and axially extending across an outer circumference of the disk 1 and a connecting portion 4 for connecting respective ends of both arms 3 on the inner side of the disk 1.

As shown in FIG. 1 through FIG. 4, each arm 3 of the carrier 2 has two pad guides 3A formed on the inner side and outer side of the disk 1, respectively. Each pad guide 3A has a cross section substantially in the form of a projection in a circumferential direction of the disk 1 and is fitted into a recess 7 of a friction pad 6 with a pad spring 8 being disposed therebetween (with respect to the friction pad 6, the recess 7 and the pad spring 8, detailed explanation will be given below).

The pad guide 3A of each arm 3 is capable of preventing displacement of the friction pad 6 in the circumferential direction of the disk 1 and guiding the friction pad 6 for axial sliding movement relative to the disk 1. The pad guide 3A is engaged with the recess 7 of the friction pad 6 through the pad spring 8 and serves to receive a braking torque from the disk 1.

Reference numeral 5 denotes a caliper slidably supported by the carrier 2. The caliper 5 comprises an inner leg portion 5A, a bridging portion 5B, an outer leg portion 5C and a pair of mounting portions 5D. The inner leg portion 5A is disposed on the inner side of the disk 1 and carries, for example, one cylinder (not shown) formed therein. The bridging portion 5B extends from the inner leg portion 5A across the outer circumference of the disk 1 between both arms 3 of the carrier 2 toward the outer side of the disk 1. The outer leg portion 5C is disposed on the outer side of the disk 1, such that it is bifurcated from the end of the bridging portion 5B on the outer side of the disk 1 and extends substantially in parallel to the inner leg portion 5A. The pair of mounting portions 5D are projected from both ends (on the left and right sides as viewed in FIG. 1) of the inner leg portion 5A. Each mounting portion 5D is mounted on the carrier 2 so as to be slidable in the direction of the axis of the disk 1.

A piston (not shown) is slidably fitted in the cylinder in the inner leg portion 5A. During use of the brake, the piston slides within the cylinder in response to fluid pressure applied from the outside. The piston and the outer leg portion 5C press the friction pads 6 against both surfaces of the disk 1.

Figure 2:
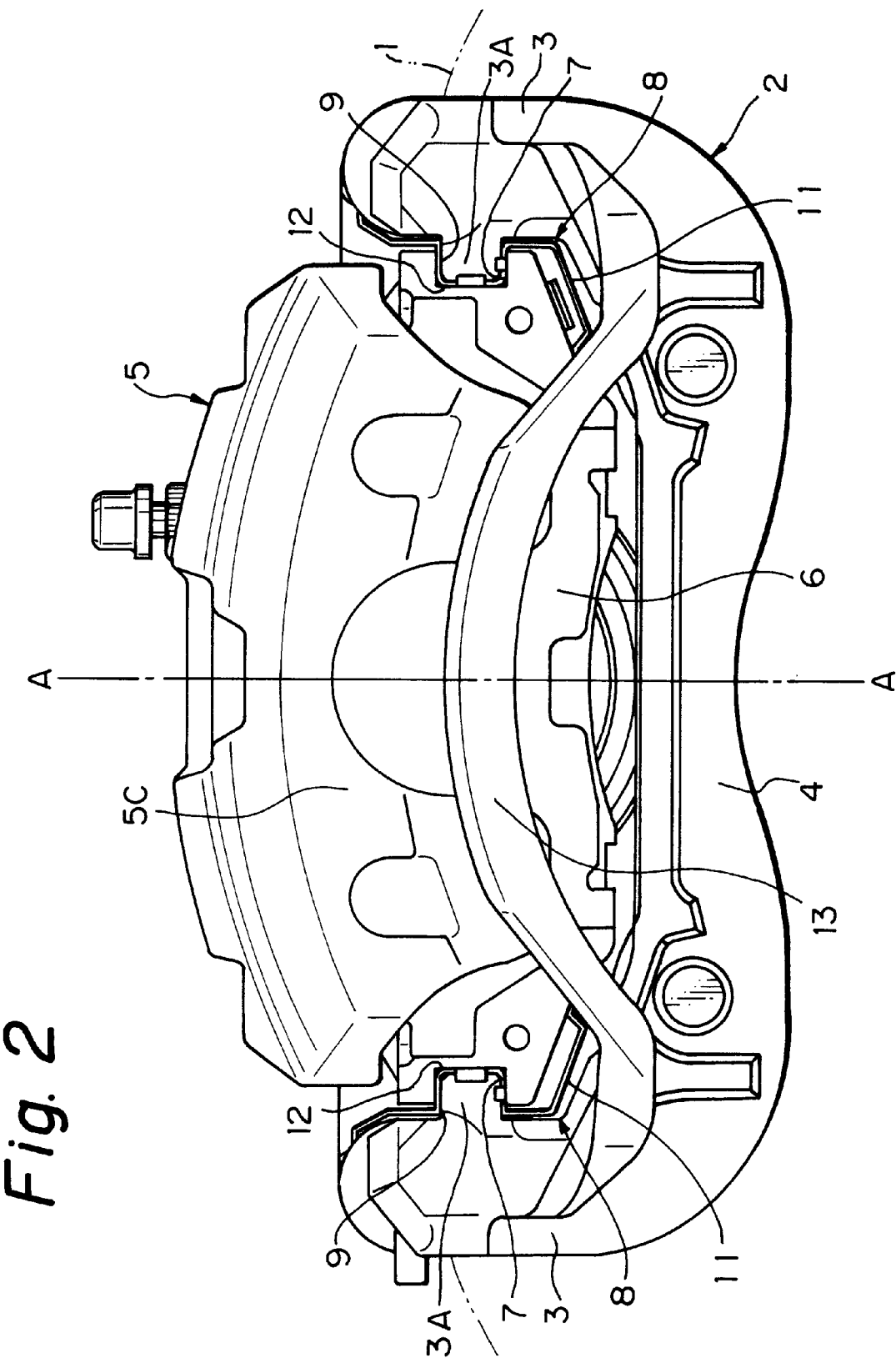
FIG. 2 is a rear view of the disk brake shown in FIG. 1.
Figure 3:
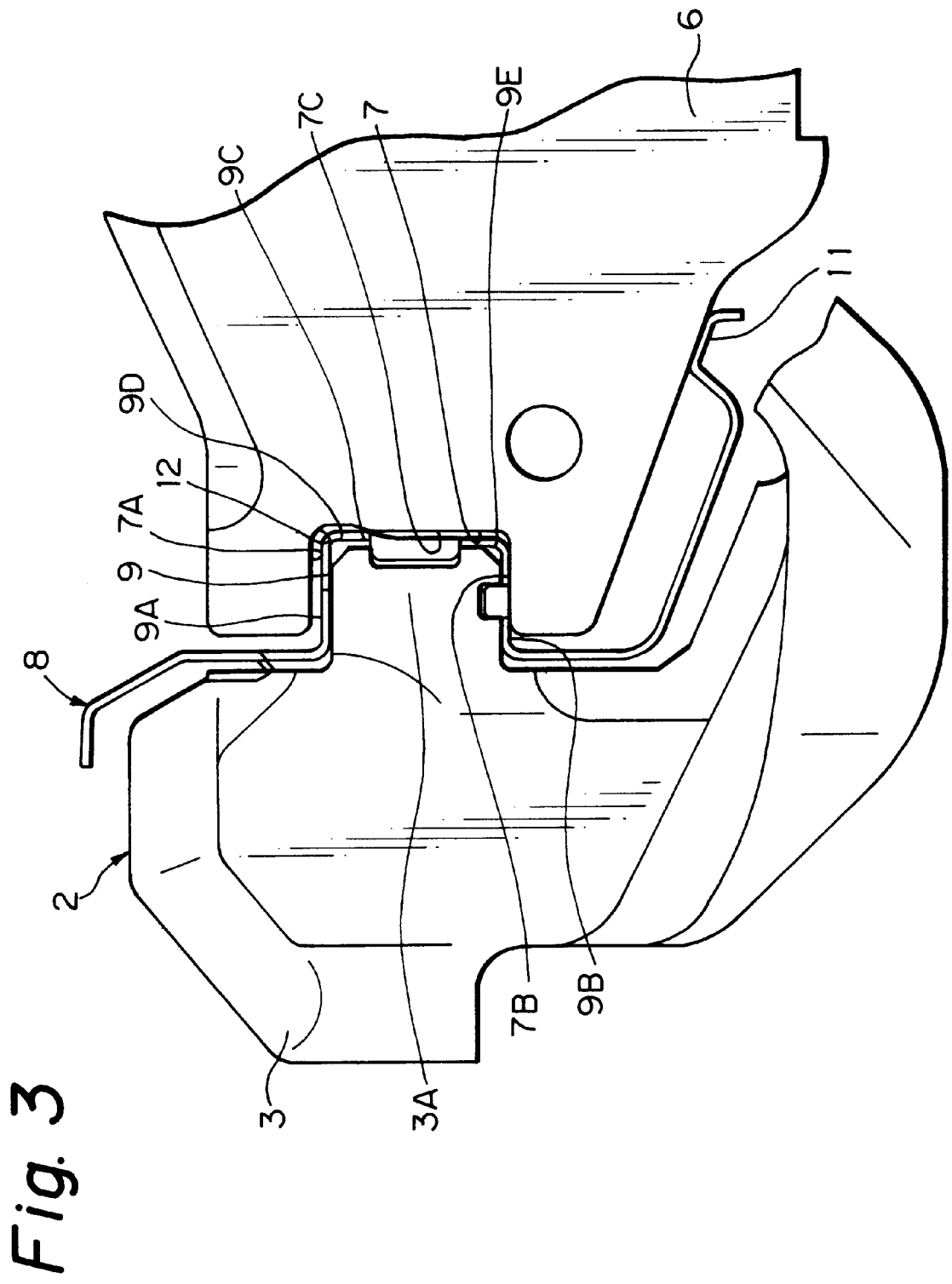
FIG. 3 is an enlarged view of an essential part of the disk brake shown in FIG. 2.

Hereinbelow, explanation is made in detail with regard to the friction pad 6, the recess 7 and the pad spring 8. Reference numerals 6 denote a pair of friction pads disposed on the inner side and outer side of the disk 1, respectively. As shown in FIGS. 1 to 3, each friction pad 6 is formed into a substantially fanlike shape longer in a lateral direction and is symmetrical with respect to a center line A—A of the carrier 2 in FIG. 2. The friction pad 6 has recesses 7 at both ends in a longitudinal direction thereof corresponding to the respective pad guides 3A of both arms 3 of the carrier 2 on one side of the disk 1. The recesses 7 are fitted, with small clearance, onto respective guide plates 9 of the pad springs 8 mounted on the pad guides 3A. It is preferred that the size of the clearance between each recess 7 of the friction pad 6 and the guide plate 9 of the pad spring 8 mounted on the pad guide 3A onto which the recess 7 is fitted be varied in the range of from 0.1 to 0.9 mm, depending on the entire length of the friction pad 6.

Figure 5:
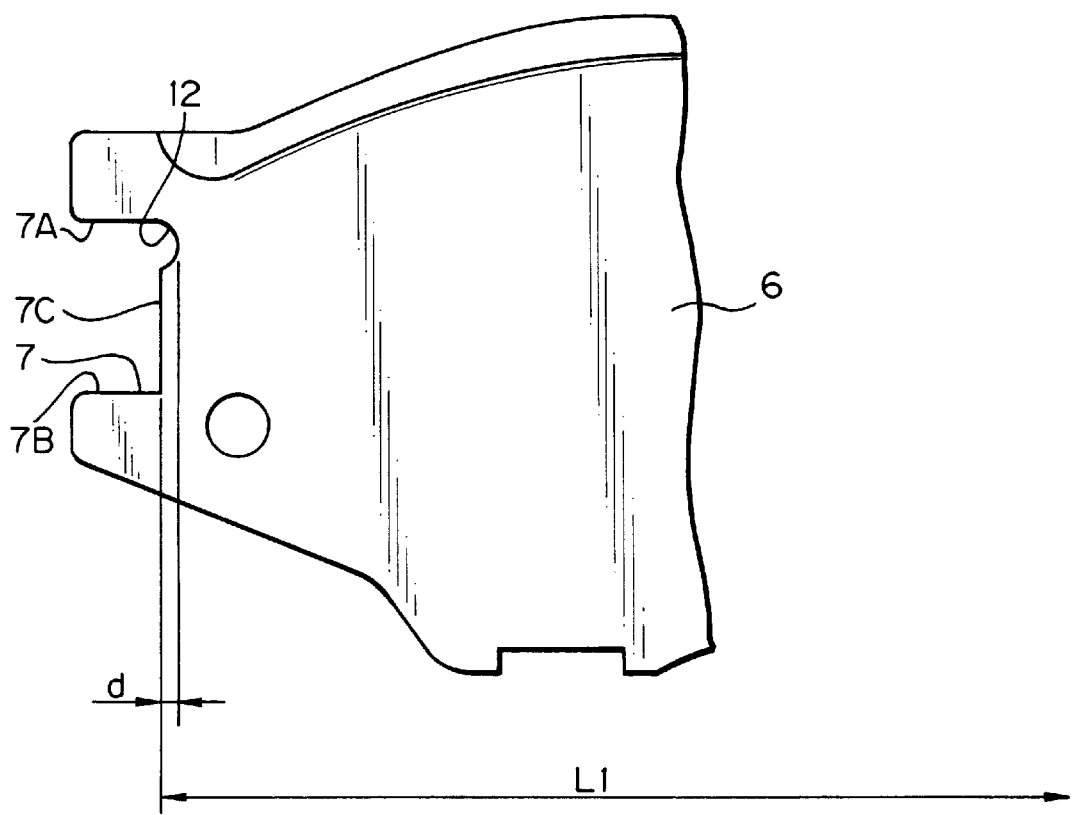
FIG. 5 is a general view of an essential part of the friction pad of the disk brake shown in FIG. 3.

As shown in FIGS. 3 and 5, the recess 7 is defined by a wall surface which is formed along the pad guide 3A. The wall surface of the recess 7 comprises an upper portion 7A positioned radially outwardly of the pad guide 3A and circumferentially extending; a lower portion 7B positioned radially inwardly of the pad guide 3A and extending in parallel to the upper portion 7A; and a bottom portion 7C extending in a radial direction of the disk 1 between the upper and lower portions 7A and 7B.

In FIG. 5, L1 represents a distance between the respective bottom portions 7C of both recesses 7 of each friction pad 6 in the longitudinal direction thereof. Both recesses 7 of each friction pad 6 are slidably supported by the pad guides 3A onto which the recesses 7 are fitted. When the friction pads 6 on the inner and outer sides of the disk 1 are pressed against both surfaces of the disk 1 by the caliper 5, a braking force is applied to the disk 1.

Reference numerals 8 denote a pair of pad springs, respectively, mounted on the pad guides 3A of both arms 3 of the carrier 2. Each pad spring 8 is formed into the shape as shown in FIGS. 1 and 2 by pressing an elastic material, such as a stainless steel plate. The pad spring 8 extends within a gap between the pad guide 3A of each arm 3 of the carrier 2 and the recess 7 of the friction pad 6 which is fitted onto the pad guide 3A.

Figure 4:
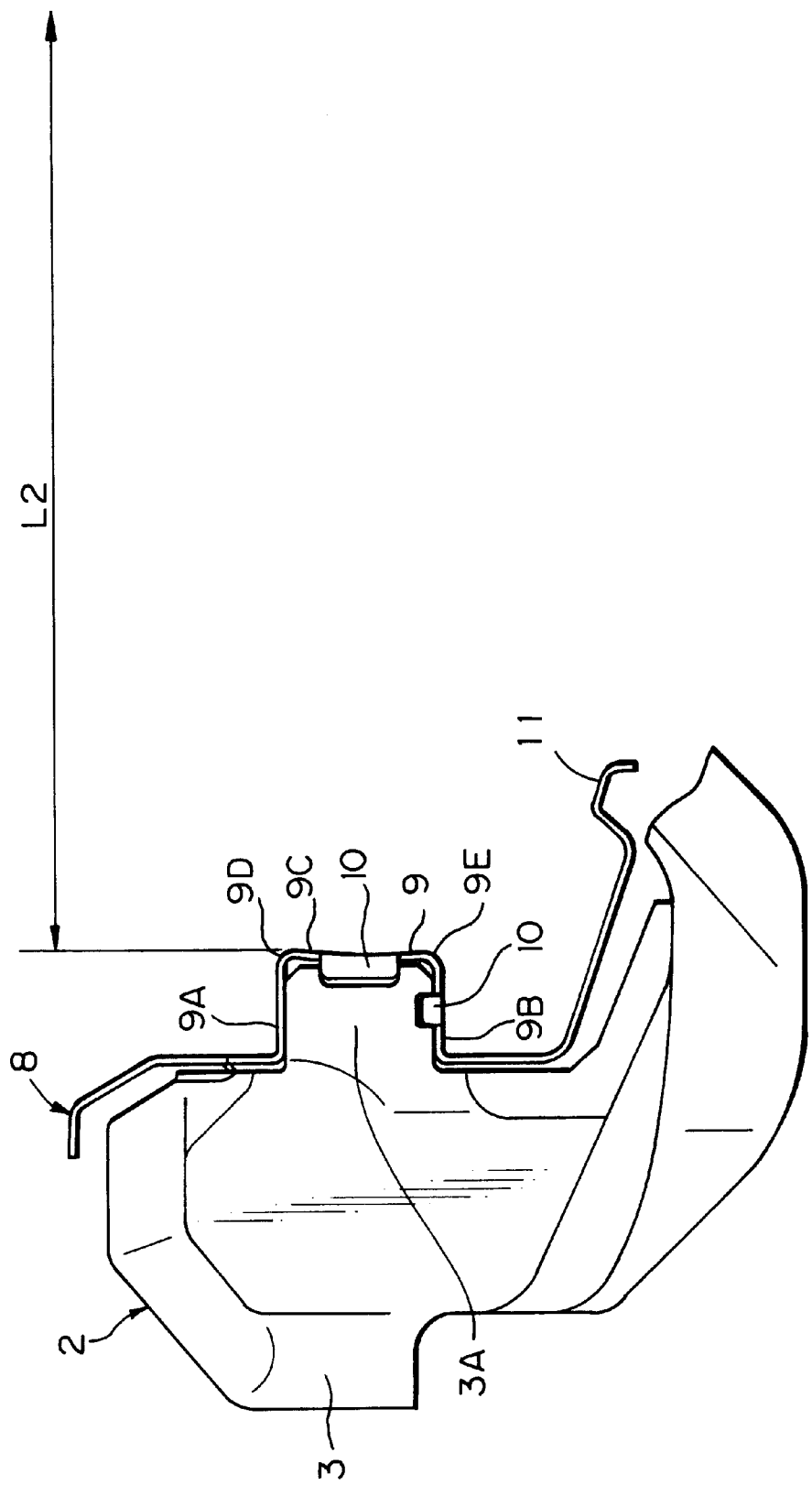
FIG. 4 is a general view of the essential part of the disk brake shown in FIG. 3, in which the friction pad is removed.

As shown in FIGS. 3 and 4, each pad spring 8 has integrally formed therewith the guide plate 9, which is bent along the corresponding pad guide 3A of the arm 3 of the carrier 2 on which the pad spring 8 is mounted, and formed into a substantially U-shape. The guide plate 9 comprises: holding portions 9A and 9B facing the upper and lower portions 7A and 7B of the recess 7 fitted onto the corresponding pad guide 3A (as shown in FIG. 4), respectively, and holding the corresponding pad guide 3A at upper and lower portions thereof; and a connecting portion 9C facing the bottom portion 7C of the recess 7 fitted onto the corresponding pad guide 3A (as shown in FIG. 3) and integrally connecting the holding portions 9A and 9B. The holding portions 9A and 9B of the guide plate 9 of the pad spring 8 are resiliently engaged with and press against the corresponding pad guide 3A of the arm 3 of the carrier 2 as shown in FIGS. 3 and 4, so that the pad spring 8 (of course, the guide plate 9) is firmly and stably mounted on the arm 3 of the carrier 2.

Each guide plate 9 includes L-shaped bent portions 9D and 9E formed between the holding portion 9A and the connecting portion 9C and between the holding portion 9B and the connecting portion 9C, respectively. When the guide plate 9 is resiliently engaged with the corresponding pad guide 3A of the arm 3 of the carrier 2, one of the bent portions 9D and 9E of the guide plate 9, for example, the bent portion 9D is slightly separated from corner portion of the corresponding pad guide 3A and deformed into a projection in the circumferential direction of the disk 1 toward the recess 7 fitted onto the corresponding pad guide 3A, while this tendency is not as significant for the other bent portion 9E. In this case, as shown in FIG. 4, the distance L2 between the respective bent portions 9D of the guide plates 9 of the pair of pad springs 8 mounted on the pad guides 3A of both arms 3 of the carrier 2 becomes shorter than the distance L1 between the respective bottom portions 7C of both recesses 7 of each friction pad 6 (L2<L1).

As shown in FIG. 4, each of the holding portion 9B and the connecting portion 9C of the guide plate 9 has engaging tabs 10 projecting therefrom for engaging with the corresponding pad guide 3A of the arm 3 of the carrier 2 at the opposite ends so as to prevent axial movement of the guide plate 9 of the pad spring 8 from the corresponding pad guide 3A.

Further, each pad spring 8 has integrally formed therewith pad supporting plate portions 11 which are positioned radially inwardly of the friction pads (at a lower position as viewed in FIG. 3) and resiliently contacts with the friction pads 6 on the inner and outer sides of the disk 1, to thereby press the friction pads 6 radially outwardly toward the carrier 2. The guide plates 9 of the pad springs 8 support and guide the recesses 7 of the friction pads 6 for axial sliding movement.

Reference numeral 12 denotes a groove formed in each recess 7 of the friction pads 6. As shown in FIGS. 3 and 5, the groove 12 is formed in the recess 7 to thereby provide a depression at a corner portion between the upper portion 7A and the bottom portion 7C corresponding to the projecting bent portion 9D of the guide plate 9 of the pad spring 8 mounted on the pad guide 3A onto which the recess 7 is fitted.

The groove 12 is formed around the bent portion 9D so that a predetermined clearance is provided therebetween. From the viewpoint of ease of assembly, it is preferred that the depth of the groove 12 be in the range of from 0.1 to 0.9 mm. Thus, the bent portion 9D which is separated from the associated corner portion of the corresponding pad guide 3A and deformed into a projection toward the recess 7 fitted onto the corresponding pad guide 3A can be accommodated within the groove 12 in the recess 7, so that frictional contact (interference) of the projecting bent portion 9D of the guide plate 9 with the bottom portion 7C of the recess 7 can be surely prevented.

Incidentally, reference numeral 13 (FIG. 2) denotes a reinforcing beam integrally formed with the carrier 2. The reinforcing beam 13 is disposed outside the outer leg portion 5C of the caliper 5 as viewed in the direction of axis of the disk 1 and formed into a bowlike shape extending between both arms 3 of the carrier 2. The reinforcing beam 13 integrally connects respective ends of both arms 3 on the outer side of the disk 1, to thereby provide high rigidity of the carrier 2 as a whole.

The disk brake of the present invention arranged as mentioned above is operated as follows. The piston in the cylinder carried by the inner leg portion 5A of the caliper 5 is caused to slide toward the disk 1 in response to fluid pressure applied from the outside, and the pair of friction pads 6, which are disposed between both arms 3 of the carrier 2 on the inner and outer sides of the disk 1, slide on the pair of pad springs 8 toward the disk 1. Thus, the friction pads 6 are pressed against both surfaces of the disk 1 between the piston and the outer leg portion 5C, to thereby apply a braking force to the disk 1.

In the above-mentioned first embodiment of the present invention, the holding portions 9A and 9B of the guide plate 9 of each pad spring 8 are resiliently engaged with and press against the corresponding pad guide 3A of the arm 3 of the carrier 2 on which the pad spring 8 is mounted, so that the pad spring 8 can be firmly and stably mounted on the arm 3 of the carrier 2 without any play therebetween. Therefore, a lowering of slidability of the friction pad 6 relative to the guide plate 9 of the pad spring 8 during operation of the brake due to unstable mounting of the pad spring 8 (due to play), which causes "drag" after operation of the brake, can be avoided.

On the other hand, when the pad spring 8 is mounted on each arm 3 of the carrier 2, one of the bent portions 9D and 9E of the guide plate 9 of the pad spring 8 (the bent portion 9D in the first embodiment of the present invention) is separated from the corner portion of the pad guide 3A of the arm 3 and deformed into a projection in the circumferential direction of the disk 1 toward the recess 7 which is fitted onto the pad guide 3A. In the first embodiment of the present invention, each of the recesses 7 fitted onto the pad guides 3A of the arm 3 includes the groove 12 at a corner portion between the upper portion 7A and the bottom portion 7C corresponding to the projecting bent portion 9D of the guide plate 9 of the pad spring 8. By this arrangement, the projecting bent portion 9D can be accommodated within the groove 12 in the recess 7, to thereby surely prevent interference of the projecting bent portion 9D with the recess 7.

Accordingly, in the first embodiment of the present invention, when fitting the recess 7 of the friction pad 6 onto the pad guide 3A of the arm 3 of the carrier 2 through the guide plate 9 of the pad spring 8, the projecting bent portion 9D of the guide plate 9 is accommodated within the groove 12 in the recess 7, so that interference of the projecting bent portion 9D of the guide plate 9 with the recess 7 can be surely prevented. Therefore, the recess 7 of the friction pad 6 can be easily and smoothly fitted onto the guide plate 9 of the pad spring 8, to thereby hold the friction pad 6 between the respective pad guides 3A of both arms 3 on each of the inner and outer sides of the disk 1 through the pad springs 8. Thus, an operation for mounting the friction pads 6 can be easily conducted in a short period of time, to thereby improve operability.

Further, when the friction pad 6 is mounted on the carrier 2, the frictional contact (interference) of the projecting bent portion 9D of the guide plate 9 of the pad spring 8 with the recess 7 of the friction pad 6 can be surely prevented, so that a lowering of slidability of the recess 7 of the friction pad 6 relative to the projecting bent portion 9D can be effectively suppressed, to thereby maintain excellent slidability of the friction pad 6 and surely prevent the occurrence of "drag" after operation of the brake.

Figure 6:
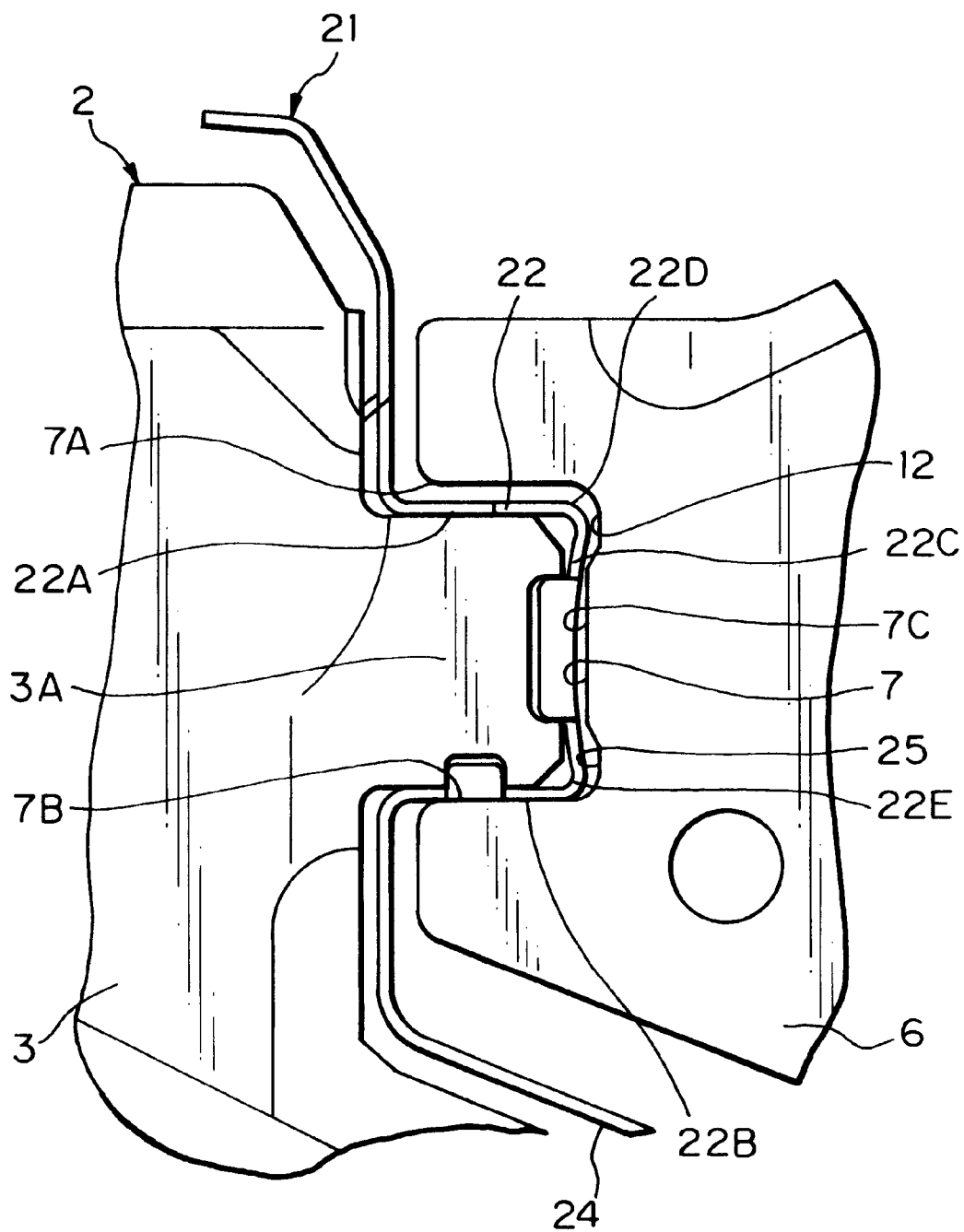
FIG. 6 is an enlarged view of an essential part of the disk brake according to a second embodiment of the present invention.
Figure 7:
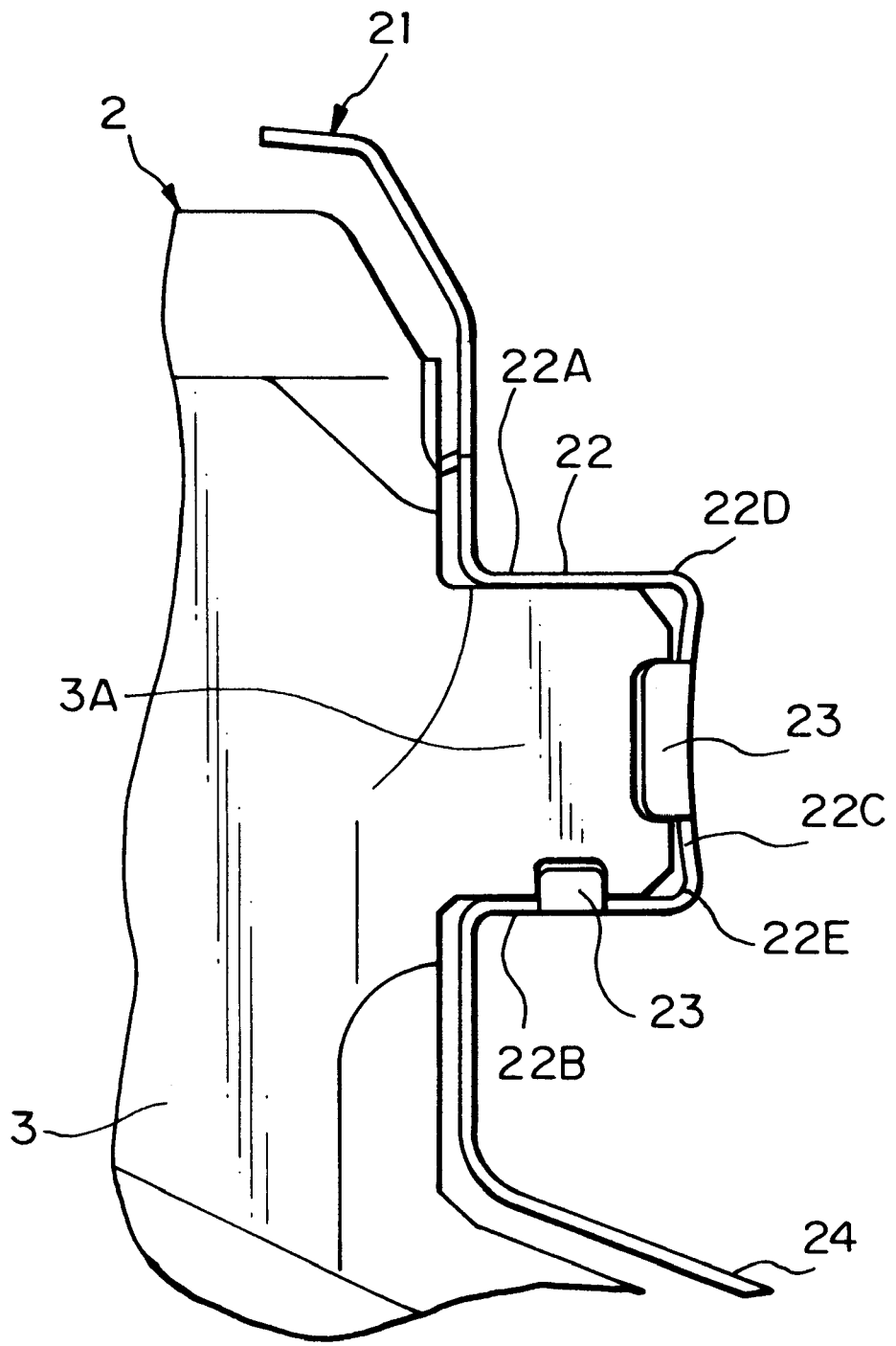
FIG. 7 is a general view of the essential part of the disk brake shown in FIG. 6, in which the friction pad is removed.

Next, a second embodiment of the present invention is explained, with reference to FIGS. 6 and 7. In connection with the first embodiment of the present invention, like parts are given like reference numerals and will not described herein. In the second embodiment of the present invention, a guide plate 22 of a pad spring 21 is resiliently engaged with and presses against the pad guide 3A of the arm 3 of the carrier 2. Each recess 7 of the friction pads 6 includes not only the groove 12 but also a groove 25. The groove 25 is formed in the recess 7 at a position corresponding to a bent portion 22E between a holding portion 22B and a connecting portion 22C of the guide plate 22.

The construction of the pad spring 21 is substantially the same as that of the pad spring 8 in the first embodiment of the present invention. The pad spring 21 comprises the guide plate 22, engaging tabs 23 and a pad supporting plate portion 24. The guide plate 22 comprises holding portions 22A and 22B and a connecting portion 22C, and is formed into a substantially U-shape. Each recess 7 of the friction pads 6 includes the groove 12 corresponding to a projecting bent portion 22D between the holding portion 22A and the connecting portion 22C of the guide plate 22.

However, the guide plate 22 of the pad spring 21 is different from the guide plate 9 of the pad spring 8 in the first embodiment of the present invention in that not only the bent portion 22D but also the bent portion 22E of the guide plate 22 is separated from the pad guides 3A and deformed into a projection in the circumferential direction of the disk 1 toward the recess 7 fitted onto the pad guide 3A.

The groove 25 is formed in the recess 7 at a corner portion between the lower portion 7B and the bottom portion 7C corresponding to the projecting bent portion 22E and accommodates the projecting bent portion 22E.

Thus, in the second embodiment of the present invention, when fitting the recess 7 of the friction pad 6 onto the pad guide 3A of the arm 3 of the carrier 2 through the guide plate 22 of the pad spring 21, the frictional contact (interference) of the projecting bent portions 22D and 22E of the guide plate 22 of the pad spring 21 with the recess 7 of the friction pad 6 can be surely prevented by means of the grooves 12 and 25, so that the disk brake according to the second embodiment of the present invention is as advantageous as the disk brake according to the first embodiment of the present invention.

Incidentally, in the first embodiment of the present invention, the groove 12 is formed in the recess 7 only at a corner portion between the upper portion 7A and the bottom portion 7C. However, in the present invention, a groove may be formed in the recess 7 only at a corner portion between the lower portion 7B and the bottom portion 7C.

Further, in the first and second embodiments of the present invention, the disk brake is applied to a vehicle, such as an automobile. However, the disk brake of the present invention may also be used as a braking apparatus for uses other than the vehicle.

What is claimed is:

1. A disk brake comprising:
    a carrier including a pair of arms spaced from each other in the circumferential direction of a disk and axially extending across the disk, each of said arms having formed therewith a projecting pad guide;
    a caliper;
    a pair of friction pads adapted to be pressed against both surfaces of said disk by said caliper and each having recesses fitted onto said pad guides of said carrier; and
    a pair of pad springs, respectively, mounted at least on said pad guides of the carrier, said pad springs resiliently supporting said friction pads and each having integrally formed therewith a guide plate, said guide plate being bent along the corresponding pad guide of said carrier on which said pad spring is mounted and being resiliently engaged with and pressing against said corresponding pad guide,
    wherein each recess of the friction pads includes an indent at a position corresponding to at least one of the bent portions of said guide plate of the pad spring mounted on the pad guide onto which said recess of the friction pads is fitted.

2. A disk brake according claim 1, wherein said guide plate is bent to form a rectangular shape having one side opened to have upper and lower portions and a connecting portion therebetween to form a bent portion between said upper and connecting portions and a bent portion between said lower and connecting portions.

3. A disk brake according to claim 2, wherein said indent is formed at a position corresponding to the bent portion between said upper and connecting portions of the guide plate.

4. A disk brake according to claim 2, wherein said indent is formed at a position corresponding to the bent portion between said lower and connecting portions of the guide plate.

5. A disk brake according to claim 2, wherein indent portions are formed at both positions corresponding to the bent portions between said upper and connecting portions and between said lower and connecting portions of the guide plate.

6. A disc brake comprising:
    a carrier including a pair of arms spaced from each other along a circumferential direction of a disk and axially extending across the disk, each of said arms having a projecting pad guide;
    a caliper;
    a pair of friction pads adapted to be pressed against both surfaces of the disk by said caliper, each of said friction pads having recesses fitted onto said pad guides of said carrier; and a pair of pad springs mounted at least on said pad guides of said carrier, respectively, said pad springs resiliently supporting said friction pads and each of said pad springs having a guide plate formed integrally therewith, said guide plate being bent along the corresponding pad guide of said carrier on which said pad spring is mounted and being resiliently engaged with and pressing against said corresponding pad guide, wherein each of said friction pad recesses includes an indented portion at a position corresponding to at least one of the bent portions of said pad spring guide plate which is mounted on said pad guide and onto which said recess of said friction pads is fitted, and wherein said indented portion is formed so as to be dented in the circumferential direction of the disk.

7. A disk brake as claimed in claim 6, wherein each of said guide plates is bent so as to form a rectangular shape having an open side, an upper portion, a lower portion, and a connecting portion between said upper and lower portions so as to define a bent portion between said upper portion and said connecting portion, and a bent portion between said lower portion and said connecting portion.

8. A disk brake as claimed in claim 7, wherein said indented portion is formed at a position corresponding to the bent portion between said upper portion and said connecting portion of said guide plate.

9. A disk brake as claimed in claim 7, wherein said indented portion is formed at a position corresponding to the bent portion between said lower portion and said connecting portion of said guide plate.

10. A disk brake as claimed in claim 7, wherein each recess of said friction pads has indented portions at both positions corresponding to the bent portions between said upper portion and said connecting portion of said guide plate, and between said lower portion and said connecting portion of said guide plate.

11. A disk brake as claimed in claim 10, wherein each of said indented portions has a depth in a range of from 0.1 to 0.9 mm.

* * * * *